US012651772B2

(12) United States Patent
Choi et al.

(10) Patent No.: US 12,651,772 B2
(45) Date of Patent: Jun. 9, 2026

(54) ELECTROLYTE ADDITIVE, ELECTROLYTE FOR BATTERIES INCLUDING ELECTROLYTE ADDITIVE, AND SECONDARY BATTERY INCLUDING ELECTROLYTE

(71) Applicant: SOULBRAIN CO., LTD., Gyeonggi-do (KR)

(72) Inventors: Ji Young Choi, Gyeonggi-do (KR); Min Goo Kim, Gyeonggi-do (KR); Sang Ho Lee, Gyeonggi-do (KR); Wan Chul Kang, Gyeonggi-do (KR); Jong Chul Yun, Gyeonggi-do (KR); Hyeong Kyu Lim, Gyeonggi-do (KR); Ji Seong Han, Gyeonggi-do (KR); Min Jung Jang, Gyeonggi-do (KR)

(73) Assignee: SOULBRAIN CO., LTD., Gyeonggi-do (KR)

( * ) Notice: Subject to any disclaimer, the term of this patent is extended or adjusted under 35 U.S.C. 154(b) by 627 days.

(21) Appl. No.: 18/011,150

(22) PCT Filed: Jun. 28, 2021

(86) PCT No.: PCT/KR2021/008122

§ 371 (c)(1),
(2) Date: Dec. 16, 2022

(87) PCT Pub. No.: WO2021/261978

PCT Pub. Date: Dec. 30, 2021

(65) Prior Publication Data

US 2023/0246233 A1 Aug. 3, 2023

(30) Foreign Application Priority Data

Jun. 26, 2020 (KR) ........................ 10-2020-0078798
Oct. 13, 2020 (KR) ........................ 10-2020-0131845
Jun. 28, 2021 (KR) ........................ 10-2021-0083961

(51) Int. Cl.
*H01M 10/0567* (2010.01)
*C07F 9/6574* (2006.01)
*H01M 10/0568* (2010.01)
*H01M 10/0569* (2010.01)

(52) U.S. Cl.
CPC ..... *H01M 10/0567* (2013.01); *C07F 9/65742* (2013.01); *C07F 9/65744* (2013.01); *H01M 10/0568* (2013.01); *H01M 10/0569* (2013.01); *H01M 2250/20* (2013.01)

(58) Field of Classification Search
CPC ............ C07F 9/65742; C07F 9/65744; H01M 10/052; H01M 10/0525; H01M 10/0567; H01M 10/0568; H01M 10/0569; H01M 2250/20; H01M 2300/0025; Y02E 60/10
See application file for complete search history.

(56) References Cited

U.S. PATENT DOCUMENTS

2012/0244419 A1* 9/2012 Kwak ............... H01M 10/0568 429/188
2012/0244445 A1 9/2012 Han et al.
2014/0030610 A1* 1/2014 Abe ...................... C07F 9/5304 429/188

(Continued)

FOREIGN PATENT DOCUMENTS

CN 103326068 A 9/2013
JP 2004006382 A 1/2004

(Continued)

OTHER PUBLICATIONS

JP2007165125A, Tsujioka, "Electrolyte for nonaqueous electrolyte battery, and nonaqueous electrolyte battery", machine English translation retrieved from https://worldwide.espacenet.com/ Date: Jun. 12, 2025 (Year: 2007).*

Blackburn, et al. "Cyclic phosphate and phosphite triesters-A P31 NMR study." Tetrahedron Letters 5.39 (1964): 2873-2879 (Year: 1964).*

KR20230037259A, Yeon, et al. "Compound, non-aqueous electrolyte and lithium secondary battery comprising the same", machine English translation retrieved from https://worldwide.espacenet.com/ Date: Jan. 16, 2026 (Year: 2023).*

*Primary Examiner* — Tiffany Legette
*Assistant Examiner* — Jared Hansen
(74) *Attorney, Agent, or Firm* — SZDC Law PC

(57) ABSTRACT

The present invention relates to an electrolyte additive including a compound represented by Chemical Formula 1, an electrolyte including the electrolyte additive, and a secondary battery including the electrolyte.

Chemical Formula 1

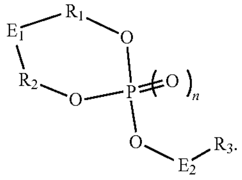

$R_1$ and $R_2$ are each independently an alkylene group having 1-5 carbon atoms; $E_1$ is a bond, an alkylene group having 1-3 carbon atoms, or a cyclic carbonyl group, ether group, or ester group having 2-5 carbon atoms; $R_3$ is a substituted or unsubstituted linear or cyclic carbonate group, carbonyl group, ether group, phosphate group, sulfonate group, or sulfate group having 2-5 carbon atoms; the substitution refers to substitution with one or more selected from F, Cl, Br, and I or an alkenyl group having 1-3 carbon atoms; $E_2$ is a bond or a saturated or unsaturated alkylene group or ether group having 1-3 carbon atoms; and n is 0 or 1.

12 Claims, No Drawings

(56) References Cited

U.S. PATENT DOCUMENTS

| | | | | |
|---|---|---|---|---|
| 2014/0272607 | A1 | 9/2014 | Amine et al. | |
| 2019/0393552 | A1* | 12/2019 | Kono ................ | H01M 10/0567 |

FOREIGN PATENT DOCUMENTS

| | | | | | |
|---|---|---|---|---|---|
| JP | 2007165125 | A | * | 6/2007 | |
| JP | 2008300126 | A | | 12/2008 | |
| JP | 2015099660 | A | | 5/2015 | |
| JP | 2015133255 | A | | 7/2015 | |
| KR | 20150128569 | A | | 11/2015 | |
| KR | 10-1586199 | B2 | | 1/2016 | |
| KR | 10-1649133 | B1 | | 8/2016 | |
| KR | 20230037259 | A | * | 3/2023 | ........ H01M 10/0567 |

* cited by examiner

ELECTROLYTE ADDITIVE, ELECTROLYTE FOR BATTERIES INCLUDING ELECTROLYTE ADDITIVE, AND SECONDARY BATTERY INCLUDING ELECTROLYTE

This application is the National Stage Application of PCT/KR2021/008122, filed on Jun. 28, 2021, which claims priority to Korean Patent Application Nos. KR 10-2020-0078798, filed on Jun. 26, 2020, KR 10-2020-0131845, filed on Oct. 13, 2020, and KR 10-2021-0083961, Jun. 28, 2021, all of which are incorporated by reference for all purposes as if fully set forth herein.

TECHNICAL FIELD

The present invention relates to an electrolyte additive, an electrolyte for batteries including the electrolyte additive, and a secondary battery including the electrolyte, and more particularly, to an electrolyte additive capable of improving the charging efficiency and output of batteries, enabling long-term storage, and increasing a capacity retention rate at high temperatures.

BACKGROUND ART

In a lithium secondary battery, an electrolyte between a positive electrode and a negative electrode enables smooth movement of lithium ions, and use of electric energy is promoted according to a method in which electricity is generated or consumed by oxidation-reduction reaction according to intercalation and desorption at the positive and negative electrodes.

Recently, as interest in the environment increases worldwide, environmental regulations are being strengthened. Accordingly, interest in eco-friendly automobiles that can replace internal combustion engine automobiles, which are one of the main causes of air pollution, is also increasing. Accordingly, domestic and foreign battery industries are actively developing automobile batteries.

To use a battery in an automobile, the output and capacity of the battery must be greatly increased, and problems such as a decrease in output and an increase in resistance at high and low temperatures must be solved in consideration of use environments such as weather. In addition, considering that automobiles are used outdoors regardless of the season, it is necessary to develop a large-capacity battery that can be charged in various environments and has an increased capacity retention rate.

RELATED ART DOCUMENTS

Patent Documents

Jap 2008-300126 A

KR 10-1586199 B1

DISCLOSURE

Technical Problem

Therefore, the present invention has been made in view of the above problems, and it is one object of the present invention to provide a novel electrolyte additive for batteries, an electrolyte for batteries including the electrolyte additive, and a secondary battery including the electrolyte.

It is another object of the present invention to provide a secondary battery having improved battery output due to reduced charge resistance, capable of long-term storage due to improved recovery capacity at high temperatures, and having excellent lifespan maintenance at high temperatures.

The above and other objects can be accomplished by the present invention described below.

Technical Solution

In accordance with one aspect of the present invention, provided is an electrolyte additive including a compound represented by Chemical Formula 1 below:

[Chemical Formula 1]

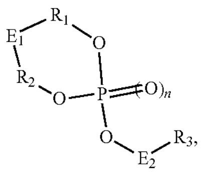

wherein $R_1$ and $R_2$ are each independently an alkylene group having 1 to 5 carbon atoms; $E_1$ is a bond, an alkylene group having 1 to 3 carbon atoms, or a cyclic carbonyl group, ether group or ester group having 2 to 5 carbon atoms; $R_3$ is a substituted or unsubstituted linear or cyclic carbonate group, carbonyl group, ether group, phosphate group, sulfonate group or sulfate group having 2 to 5 carbon atoms; the substitution refers to substitution with one or more selected from the group consisting of F, Cl, Br and I, or an alkenyl group having 1 to 3 carbon atoms; $E_2$ is a bond, or a saturated or unsaturated alkylene group or ether group having 1 to 3 carbon atoms; and n is 0 or 1.

In accordance with another aspect of the present invention, provided is an electrolyte additive including a compound represented by Chemical Formula 1-1 below:

[Chemical Formula 1-1]

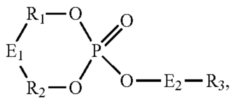

wherein $R_1$ and $R_2$ are each independently an alkylene group having 1 to 5 carbon atoms; $E_1$ is a bond, an alkylene group having 1 to 3 carbon atoms, or a cyclic carbonyl group, ether group or ester group having 2 to 5 carbon atoms; $R_3$ is a substituted or unsubstituted linear or cyclic carbonate group, carbonyl group, ether group, phosphate group, sulfonate group or sulfate group having 2 to 5 carbon atoms; the substitution refers to substitution with one or more selected from the group consisting of F, Cl, Br and I, or an alkenyl group having 1 to 3 carbon atoms; and $E_2$ is a bond, or a saturated or unsaturated alkylene group or ether group having 1 to 3 carbon atoms.

In accordance with yet another aspect of the present invention, provided is an electrolyte including the electrolyte additive and a secondary battery including the electrolyte.

Advantageous Effects

A secondary battery including an electrolyte including an electrolyte additive according to the present invention has improved charging efficiency and output due to low charge resistance, can be stored for a long time, and has excellent capacity retention at high temperatures.

BEST MODE

Hereinafter, the present invention will be described in detail, but the present invention is not limited thereto.

The present inventors have studied a secondary battery having improved output and excellent recovery capacity and lifespan characteristics at high temperatures to manufacture an automobile battery. While conducting the above research, the present inventors confirmed that all of the above objects were achieved when an additive having a specific structure was added to an electrolyte of a secondary battery. Based on these results, the present inventors conducted further studies to complete the present invention.

An electrolyte additive according to embodiments of the present invention includes a compound represented by Chemical Formula 1 below. In this case, the charging efficiency and output of a secondary battery may be improved due to the low charge resistance thereof. In addition, the secondary battery may have a long lifespan, and may have excellent capacity retention at high temperatures.

[Chemical Formula 1]

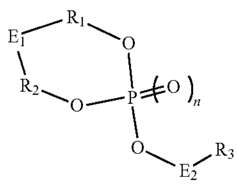

In Chemical Formula 1, $R_1$ and $R_2$ are each independently an alkylene group having 1 to 5 carbon atoms; $E_1$ is a bond, an alkylene group having 1 to 3 carbon atoms, or a cyclic carbonyl group, ether group, or ester group having 2 to 5 carbon atoms; $R_3$ is a substituted or unsubstituted linear or cyclic carbonate group, carbonyl group, ether group, phosphate group, sulfonate group, or sulfate group having 2 to 5 carbon atoms; the substitution refers to substitution with one or more selected from the group consisting of F, Cl, Br, and I or an alkenyl group having 1 to 3 carbon atoms; $E_2$ is a bond or a saturated or unsaturated alkylene group or ether group having 1 to 3 carbon atoms; and n is 0 or 1.

In addition, the electrolyte additive according to embodiments of the present invention includes a compound represented by Chemical Formula 1-1 below. In this case, the charging efficiency and output of a secondary battery may be improved due to the low charge resistance thereof. In addition, the secondary battery may have a long lifespan, and may have excellent capacity retention at high temperatures.

[Chemical Formula 1-1]

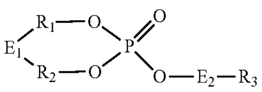

In Chemical Formula 1-1, $R_1$ and $R_2$ are each independently an alkylene group having 1 to 5 carbon atoms; $E_1$ is a bond, an alkylene group having 1 to 3 carbon atoms, or a cyclic carbonyl group, ether group, or ester group having 2 to 5 carbon atoms; $R_3$ is a substituted or unsubstituted linear or cyclic carbonate group, carbonyl group, ether group, phosphate group, sulfonate group, or sulfate group having 2 to 5 carbon atoms; the substitution refers to substitution with one or more selected from the group consisting of F, Cl, Br, and I or an alkenyl group having 1 to 3 carbon atoms; and $E_2$ is a bond or a saturated or unsaturated alkylene group or ether group having 1 to 3 carbon atoms.

In the present disclosure, the alkylene group means a divalent hydrocarbon group, and as a specific example, a propylene group is $—CH_2CH_2CH_2—$ or $—CH_2CH(CH_3)—$.

In the present disclosure, the alkenyl group means a monovalent hydrocarbon group containing a carbon-carbon double bond, and as a specific example, an n-butenyl group is $CH_2{=}CHCH_2CH_2—$.

Preferably, $R_1$ and $R_2$ are each independently an alkylene group having 1 to 2 carbon atoms. In this case, the charging efficiency and output of a secondary battery may be improved due to the low charge resistance thereof. In addition, the secondary battery may have a long lifespan, and may have excellent capacity retention at high temperatures.

$E_1$ is preferably a bond or a cyclic carbonyl group, ether group, or ester group having 2 to 3 carbon atoms. In this case, the charging efficiency and output of a secondary battery may be improved due to the low charge resistance thereof. In addition, the secondary battery may have a long lifespan, and may have excellent capacity retention at high temperatures.

$R_3$ is preferably a substituted or unsubstituted linear or cyclic carbonate group, carbonyl group, ether group, phosphate group, or sulfate group having 2 to 3 carbon atoms, and the substitution preferably refers to substitution with F or a vinyl group. In this case, the charging efficiency and output of a secondary battery may be improved due to the low charge resistance thereof. In addition, the secondary battery may have a long lifespan, and may have excellent capacity retention at high temperatures.

$E_2$ is preferably a bond or a saturated or unsaturated alkylene group or ether group having 1 to 2 carbon atoms (in the case of an unsaturated alkylene group or ether group, the number of carbon atoms is 2). In this case, the charging efficiency and output of a secondary battery may be improved due to the low charge resistance thereof. In addition, the secondary battery may have a long lifespan, and may have excellent capacity retention at high temperatures.

The compound represented by Chemical Formula 1 preferably includes one or more selected from the group consisting of compounds represented by Chemical Formulas 2 to 53 below. In this case, the charging efficiency and output of a secondary battery may be improved due to the low charge resistance thereof. In addition, the secondary battery may have a long lifespan, and may have excellent capacity retention at high temperatures.

[Chemical Formula 2]

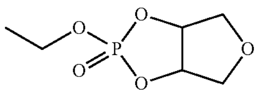

-continued

[Chemical Formula 3]

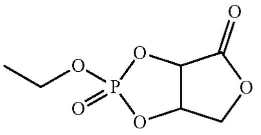

[Chemical Formula 4]

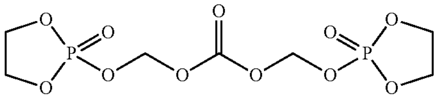

[Chemical Formula 5]

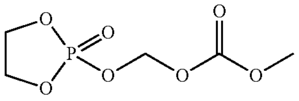

[Chemical Formula 6]

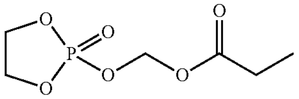

[Chemical Formula 7]

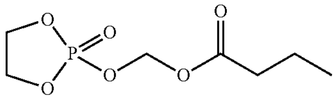

[Chemical Formula 8]

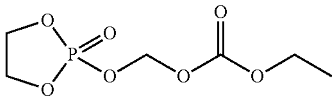

[Chemical Formula 9]

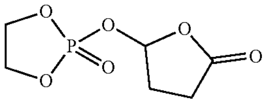

[Chemical Formula 10]

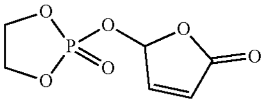

[Chemical Formula 11]

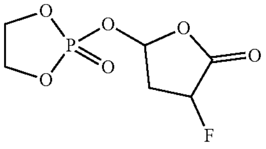

[Chemical Formula 12]

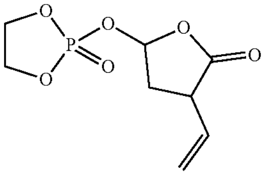

[Chemical Formula 13]

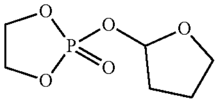

[Chemical Formula 14]

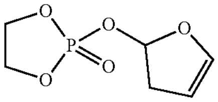

-continued

[Chemical Formula 15]

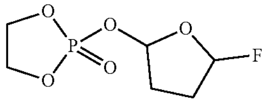

[Chemical Formula 16]

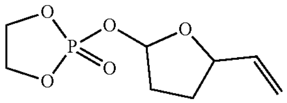

[Chemical Formula 17]

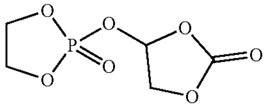

[Chemical Formula 18]

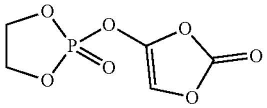

[Chemical Formula 19]

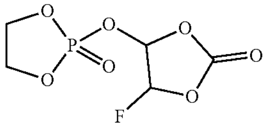

[Chemical Formula 20]

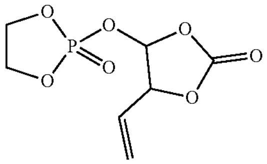

[Chemical Formula 21]

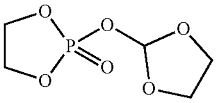

[Chemical Formula 22]

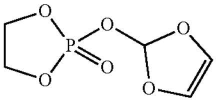

[Chemical Formula 23]

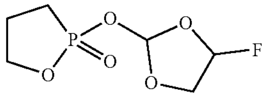

[Chemical Formula 24]

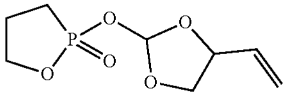

[Chemical Formula 25]

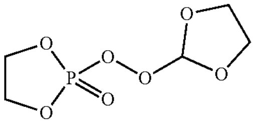

[Chemical Formula 26]

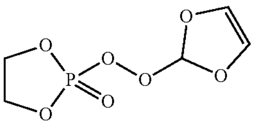

-continued

[Chemical Formula 27]

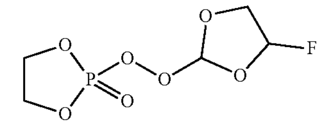

[Chemical Formula 28]

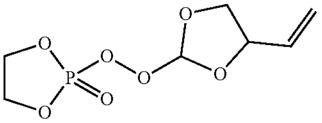

[Chemical Formula 29]

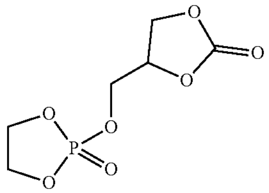

[Chemical Formula 30]

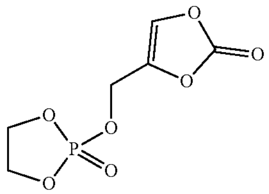

[Chemical Formula 31]

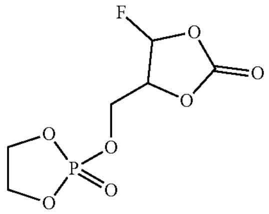

[Chemical Formula 32]

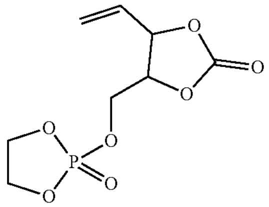

[Chemical Formula 33]

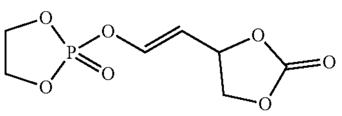

[Chemical Formula 34]

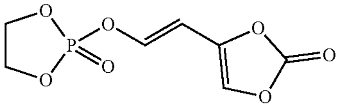

[Chemical Formula 35]

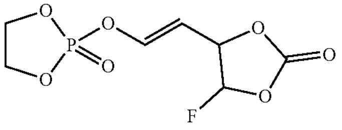

-continued

[Chemical Formula 36]

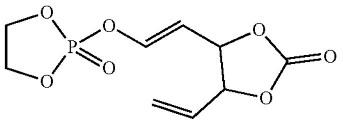

[Chemical Formula 37]

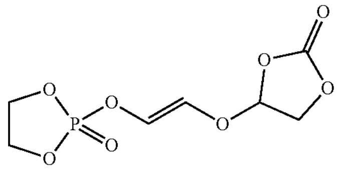

[Chemical Formula 38]

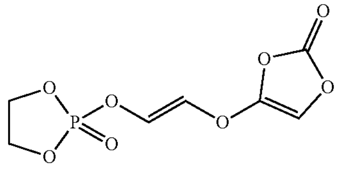

[Chemical Formula 39]

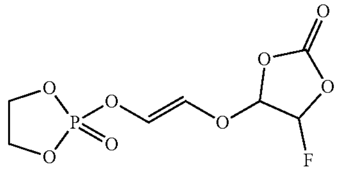

[Chemical Formula 40]

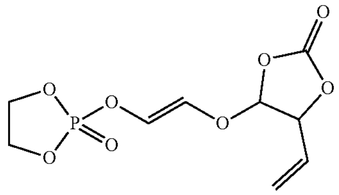

[Chemical Formula 41]

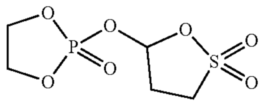

[Chemical Formula 42]

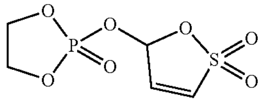

[Chemical Formula 43

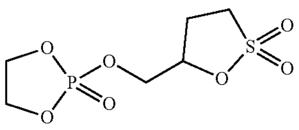

[Chemical Formula 44]

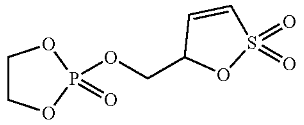

[Chemical Formula 45]

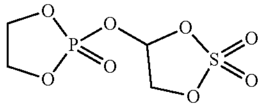

-continued

[Chemical Formula 46]

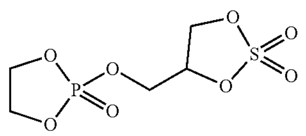

[Chemical Formula 47]

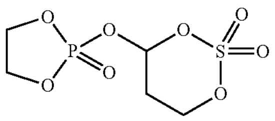

[Chemical Formula 48]

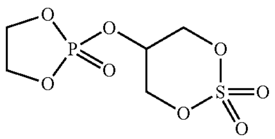

[Chemical Formula 49]

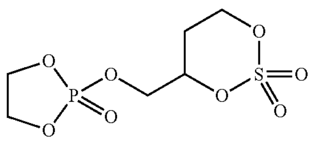

[Chemical Formula 50]

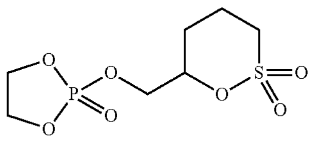

[Chemical Formula 51]

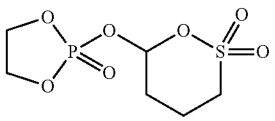

[Chemical Formula 52]

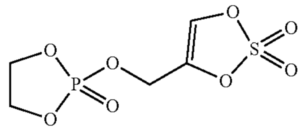

[Chemical Formula 53]

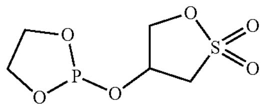

In Chemical Formulas 2 to 53, lines are bonds; when a separate element is not indicated, a point where one bond meets another bond is carbon; and hydrogens which number satisfies a valence of the carbon is omitted.

The compound represented by Chemical Formula 1-1 preferably includes one or more selected from the group consisting of the compounds represented by Chemical Formulas 2 to 52. In this case, the charging efficiency and output of a secondary battery may be improved due to the low charge resistance thereof. In addition, the secondary battery may have a long lifespan, and may have excellent capacity retention at high temperatures.

In the present disclosure, Chemical Formula 1 may include Chemical Formula 1-1. Accordingly, within the included range, all matters applied to the electrolyte additive represented by Chemical Formula 1 are equally applied to Chemical Formula 1-1.

When the electrolyte additive represented by Chemical Formula 1 is added to the electrolyte of a battery, electrons are localized toward the 0 element due to the electronegativity difference between the P element and the 0 element directly connected. Accordingly, the P element becomes electron-poor (δ+) state, and oxidation reaction is induced in the electrolyte containing lithium ions, thereby forming a stable film on an electrode, specifically, a positive electrode. At this time, decomposition of the electrolyte may be prevented due to stability of the film, and thus cycle characteristics may be improved. In particular, compared to conventional electrode films that decompose at high temperatures and have low high-temperature storage properties, the film does not decompose at high temperatures and thus has excellent high-temperature storage properties. In addition, resistance increase may be prevented, and thus charging efficiency and output may be improved. In addition, the safety of a battery may be improved because gas generation due to chemical reaction inside the battery is suppressed. In addition, structural collapse of the electrode active materials of a positive electrode and a negative electrode may be prevented at high temperatures, thereby improving capacity retention, thereby obtaining the effect of increasing a lifespan.

Based on 100% by weight in total of a battery electrolyte, the electrolyte additive represented by Chemical Formula 1 may be included in an amount of 0.1 to 10% by weight, preferably 0.2 to 5% by weight, more preferably 0.4 to 2.5% by weight, still more preferably 0.4 to 2.0% by weight, still more preferably 0.5 to 2.0% by weight, most preferably 0.5 to 1.5% by weight. Within this range, the charging efficiency of a battery may be excellent, and an effect of increasing a lifespan at high temperatures may be obtained.

In addition, the present invention provides an electrolyte including the electrolyte additive of the present invention. The electrolyte is an electrolyte of a non-aqueous lithium secondary battery, and includes the electrolyte additive, an organic solvent, and a lithium salt.

For example, the organic solvent may be a carbonate-based organic solvent, and specifically, may be an organic solvent including one or more selected from the group consisting of ethylene carbonate (EC), diethyl carbonate (DEC), ethylmethyl carbonate (EMC), dimethyl carbonate (DMC), propylene carbonate (PC), dipropyl carbonate (DPC), butylene carbonate, methylpropyl carbonate, and ethylpropyl carbonate.

For example, the organic solvent may be a single solvent or a mixed solvent prepared by mixing two or more solvents. Preferably, a mixed solvent prepared by mixing an organic solvent having a high dielectric constant and high ionic conductivity used to increase the charge/discharge performance of a battery and a low-viscosity organic solvent capable of adjusting the viscosity of a solvent to be suitable for application to the battery may be used.

For example, the organic solvent having a high dielectric constant may include EC and PC, the low-viscosity organic solvent may include EMC, DMC, and DEC, and the organic solvent having a high dielectric constant and the low-viscosity organic solvent is preferably mixed in a volume ratio of 2:8 to 8:2. More specifically, a ternary mixed solvent of EC or PC, EMC, and DEC may be used, and the ratio of EC or PC to EMC to DEC may be 3:3 to 5:2 to 4.

When the organic solvent contains moisture, lithium ions in the electrolyte may be hydrolyzed. Accordingly, the amount of moisture in the organic solvent is preferably adjusted to 150 ppm or less, preferably 100 ppm or less.

A compound capable of providing lithium ions used in a lithium secondary battery may be used as the lithium salt without particular limitation. Specifically, the lithium salt may include one or more selected from the group consisting of $LiPF_6$, $LiBF_4$, LiCl, LiBr, LiI, $LiClO_4$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, and $(CF_3SO_2)_2NLi$, preferably $LiPF_6$.

When the lithium salt is dissolved in an electrolyte, the lithium salt functions as a source of lithium ions in a lithium secondary battery and may promote the movement of lithium ions between a positive electrode and a negative electrode. Accordingly, the lithium salt is preferably included in a concentration of about 0.6 mol % to 2 mol % in the electrolyte. When the concentration of the lithium salt is less than 0.6 mol %, the conductivity of the electrolyte may be reduced, resulting in poor electrolyte performance. When the concentration of the lithium salt exceeds 2 mol %, the viscosity of the electrolyte may increase, which reduces the mobility of lithium ions. Considering the conductivity of the electrolyte and the mobility of lithium ions as described above, the lithium salt may be included in the electrolyte in an amount of preferably 0.7 mol % to 1.6 mol %, more preferably 0.8 mol % to 1.5 mol %.

For example, in addition to the electrolyte additive represented by Chemical Formula 1, the electrolyte of the present invention may further include additives (hereinafter, referred to as other additives) that may be generally used in an electrolyte for the purpose of improving lifespan characteristics of a battery, suppressing a decrease in battery capacity, and improving the discharge capacity of a battery.

Preferred specific examples of the above-described other additives may include one or more selected from the group consisting of vinylene carbonate, fluoroethylene carbonate, vinyl ethylene carbonate, ethyl propionate, propyl propionate, succinic anhydride, tetravinylsilane, hexamethylenetetramine, 1,1,2,2-tetrafluoroethyl 2,2,2-trifluoroethyl ether, 1,2-bis((difluorophosphaneyl)oxy)ethane, 1,3,6-hexanetricarbonitrile, succinonitrile, 1-ethyl-3-methylimidazolium dicyanamide, trimethoxyboroxine, lithium bis(oxaleto)borate, lithium difluro(oxalato) borate, tris (trimethylsilyl) borate, lithium tetrafluoroborate, triisopropyl borate, lithium tetrafluro(oxalato) phosphate, lithium difluro(bisoxalato) phosphate, lithium difluorophosphate, diethyl (difluoromethyl)phosphonate, tris(trimethylsilyl) phosphite, tripropagyl phosphate, 2,4,8,10-tetraoxa-3,9-dithiaspiro[5.5]undecane 3,3,9,9-tetraoxide, dimethyl sulfate, ethylene dimethanesulfonate, methylene methyl disulfonate, lithium bis(fluorosulfonyl)imide, 3-fluoro-1,3-propansulton, ethylene sulfate, 1-propene-1,3-sultone, 1,3-propylene sulfate, 1,4-butane sultone, sulfolene, biphenyl, cyclohexyl benzene, 4-fluorotoluene, triphenyl phosphate, fluorobenzene, 2-fluoro-biphenyl, and 4-((1,3,2-dioxaphospholane-2-yl)oxy)-1,2-oxathiolane 2,2-dioxide, as another preferred example, a metal phosphate compound.

The metal phosphate compound may include one or more selected from the group consisting of lithium difluoro(bisoxalato) phosphate (LiDFOP), lithium tetrafluoro oxalato phosphate (LiTFOP), lithium difluorophosphate, and lithium trioxalato phosphate.

The metal phosphate compound is added to improve the performance of a lithium secondary battery, a lithium ion capacitor, or the like, and may be included in an electrolyte in an amount of 0.3 to 1.5% by weight, preferably 0.7 to 1.2% by weight. When the content of the metal phosphate compound satisfies the above range, the low-temperature characteristics and cycle characteristics of a battery may be improved.

A secondary battery of the present invention includes a negative electrode, a positive electrode, a separator interposed between the negative and positive electrodes, and the electrolyte.

For example, the positive electrode may be prepared by obtaining a composition for forming a positive electrode active material layer by mixing a positive electrode active material, a binder, and optionally a conductive agent, and then applying the composition to a positive electrode current collector such as aluminum foil.

For example, as the positive electrode active material, a conventional lithium nickel manganese cobalt oxide (NCM, $LiNiMnCoO_2$) positive electrode active material used in lithium secondary batteries may be used. Specifically, the positive electrode active material may be a lithium composite metal oxide represented by a chemical formula of $Li[Ni_xCo_{1-x-y}Mn_y]O_2$ ($0<x<0.5$, $0<y<0.5$), but the present invention is not limited thereto.

For example, in the chemical formula of $Li[NixCo_{1-x-y}Mn_y]O_2$ representing the lithium composite metal oxide, the variables x and y may be $0.0001<x<0.5$, $0.0001<y<0.5$, or $0.001<x<0.3$, $0.001<y<0.3$.

As another example, a compound (lithiated intercalation compound) capable of reversible intercalation and deintercalation of lithium may be used as the positive electrode active material.

To improve the capacity characteristics and stability of a battery, among the compounds, one or more selected from the group consisting of $LiCoO_2$, $LiMnO_2$, $LiMn_2O_4$, $LiNiO_2$, $LiNi_xMn_{(1-x)}O_2$ ($0<x<1$), and $LiM1_xM2_yO_2$ ($0\leq x\leq 1$, $0\leq y\leq 1$, $0\leq x+y\leq 1$, and M1 and M2 are each independently one selected from the group consisting of Al, Sr, Mg, and La) may be used.

For example, the negative electrode may be prepared by obtaining a composition for forming a negative electrode active material layer by mixing a negative electrode active material, a binder, and optionally a conductive agent, and then applying the composition to a negative electrode current collector such as copper foil.

For example, as the negative electrode active material, a compound capable of reversible intercalation and deintercalation of lithium may be used.

As a specific example, the negative electrode active material may include carbonaceous materials such as artificial graphite, natural graphite, graphitized carbon fiber, and amorphous carbon. In addition to the carbonaceous materials, a metallic compound capable of alloying with lithium or a composite including a metallic compound and a carbonaceous material may also be used as the negative electrode active material. For example, graphite may be used as the negative electrode active material.

For example, as the metal capable of alloying with lithium, any one of Si, Al, Sn, Pb, Zn, Bi, In, Mg, Ga, Cd, Si alloy, Sn alloy, and Al alloy may be used.

In addition, a metallic lithium thin film may be used as the negative electrode active material. As the negative electrode active material, at least one selected from the group consisting of crystalline carbon, amorphous carbon, carbon composites, lithium metal, and lithium-containing alloys, known to have high stability, may be used.

In addition to the metal phosphate compound added to the electrolyte to improve the performance of a conventional battery, since the electrolyte additive represented by Chemical Formula 1 is added to the secondary battery of the present invention, compared to a case of adding a conventional electrolyte additive, the secondary battery of the present invention may have an effect of further improving battery characteristics such as battery charge resistance measured by hybrid pulse power characterization (HPPC), output characteristics, capacity recovery characteristics at high temperatures above 45° C., and lifespan characteristics.

Specifically, the secondary battery of the present invention may have an HPPC discharge resistance value of 90 mΩ or less, preferably 80 mΩ or less, more preferably 70 mΩ or less, still more preferably 60 mΩ or less, most preferably 50 mΩ or less, as a specific example, 40 to 50 mΩ, as measured at 45° C.

In addition, the secondary battery may have a recovery capacity (high-temperature recovery capacity) of 580 mAh or more, preferably 600 mAh or more, more preferably 630 mAh or more, still more preferably 750 mAh or more, most preferably 800 mAh or more, as a specific example, 800 to 850 mAh, as measured at 45° C.

The secondary battery may have a lifespan maintenance efficiency (high-temperature lifespan efficiency) of 80% or more, preferably 83% or more, more preferably 85% or more, as a specific example, 85 to 90%, as measured at 45° C.

In the present disclosure, the HPPC charge resistance value may be measured by the method prescribed in the literature "Battery test manual for plug-in hybrid electric vehicles (2010, Idaho National Laboratory for the U.S. Department of Energy)", and is an important index representing the output characteristics of a battery. In addition, the charge resistance is a resistance value measured during charging of a battery. As the charge resistance decreases, energy loss is reduced, thereby increasing a charging speed, and improving the output of a battery. The secondary battery of the present invention has a low HPPC charge resistance value, and has a high charging speed and excellent output. Due to these advantages, for example, the secondary battery of the present invention is suitable for use as an automobile battery.

In the present disclosure, the recovery capacity represents the capacity retention characteristics of a battery that has been left unattended for a long period of time. The recovery capacity may be obtained by measuring and comparing discharged electric capacity when a battery left for a long time is discharged to a discharge final voltage and discharged electric capacity when the discharged battery is recharged and discharged again to the discharge final voltage. As the recovery capacity increases, the amount of natural discharge due to battery preservation (storage) decreases, which means that a battery may be preserved for a long time. In particular, as the storage temperature of a battery increases, spontaneous discharge rate increases. Thus, recovery capacity at high temperatures is a very important characteristic of automotive batteries. When the electrolyte additive of the present invention is added to an electrolyte for batteries, the recovery capacity is increased by 5 to 15% compared to a case of using only a conventional additive, and thus long-term storage is possible with only one charge.

Therefore, when the battery of the present invention is used as a battery for automobiles, output dependent on the size of an automobile may be improved. In addition, performance at low and high temperatures associated with climate change and direct exposure to sunlight while driving or parked may be improved. Thus, the battery of the present invention may exhibit excellent performance as a battery for automobiles.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Synthesis Example 1: Synthesis of Compound Represented by Chemical Formula 29

2.38 g (17.2 mmol) of ethylene carbonate was added to a dried 3-neck 50 ml flask, and 5 ml of benzene was added thereto dropwise. 2.18 g (17.2 mmol) of ethylene chlorophosphite was slowly added dropwise over 1 hour while maintaining a reaction temperature at 60° C. After completion of the dropwise addition, the mixture was stirred at 60° C. for 30 minutes, and generated HCl gas was collected. The synthesized material was subjected to column purification to obtain 2.28 g (yield=50%) of cyclic phosphite ethylene carbonate as a desired product. The obtained product was analyzed using an NMR analyzer, and the results are as follows.

1H NMR (CDCl3, 400 MHz) δ=3.8 (m), 4.05 (m), 4.3 (m), 4.4 (t)

Synthesis Example 2: Synthesis of Compound Represented by Chemical Formula 53

2.38 g (17.2 mmol) of 1,3-propane sultone hydroxide was added to a dried 3-neck 50 ml flask, and 5 ml of benzene was added thereto dropwise. 2.18 g (17.2 mmol) of ethylene chlorophosphite was slowly added dropwise over 1 hour while maintaining a reaction temperature at 80° C. After completion of the dropwise addition, the mixture was stirred at 80° C. for 30 minutes, and generated HCl gas was collected. The synthesized material was subjected to column purification to obtain 2.5 g (yield=60%) of cyclic phosphite 1,3-propane sultone as a desired product. The obtained product was analyzed using an NMR analyzer, and the results are as follows.

1H NMR (CDCl3, 600 MHz) δ=3.5 (d), 3.7 (q), 4.0 (m), 4.2 (m), 4.4 (d), 4.6 (q).

Example 1

As an organic solvent, a carbonate-based mixed solvent having a volume ratio of EC:EMC:DEC of 3:4:3 was used, and 0.5% by weight of an electrolyte additive, which is the compound represented by Chemical Formula 29, was added to a solution containing $LiPF_6$ as a lithium salt in a concentration of 1.15 M to prepare an electrolyte for batteries. Here, the "content of 0.5% by weight" means an amount to be 0.5% by weight based on 100% by weight in total of the solution after adding the electrolyte additive.

Example 2

As an organic solvent, a carbonate-based mixed solvent having a volume ratio of EC:EMC:DEC of 3:4:3 was used, and 1% by weight of LiDFOP and 0.5% by weight of an electrolyte additive, which is the compound represented by Chemical Formula 29, were added to a solution containing $LiPF_6$ as a lithium salt in a concentration of 1.15 M to prepare an electrolyte for batteries.

Example 3

The same procedure as in Example 2 was performed except that the content of the electrolyte additive was changed to 0.3% by weight.

Example 4

The same procedure as in Example 2 was performed except that the content of the electrolyte additive was changed to 0.8% by weight.

Example 5

The same procedure as in Example 2 was performed except that the content of the electrolyte additive was changed to 1.0% by weight.

Example 6

The same procedure as in Example 2 was performed except that the content of the electrolyte additive was changed to 2.0% by weight.

Example 7

The same procedure as in Example 1 was performed except that, as the electrolyte additive, 1.0% by weight of the compound represented by Chemical Formula 53 was used instead of the compound represented by Chemical Formula 29.

Example 8

The same procedure as in Example 2 was performed except that, as the electrolyte additive, 1.0% by weight of the compound represented by Chemical Formula 53 was used instead of the compound represented by Chemical Formula 2.

Comparative Example 1

The same procedure as in Example 2 was performed except that, as the electrolyte additive, the compound represented by Chemical Formula 2 was not added.

Comparative Example 2

The same procedure as in Example 1 was performed except that, as the electrolyte additive, 0.5% by weight of cyclic ethylene phosphate (Cas No. 6711-47-3), which is a phosphate having an asymmetric structure, was used instead of the compound represented by Chemical Formula 2.

Manufacture of Battery

92% by weight of $Li(Ni_{0.5}Co_{0.2}Mn_{0.3})O_2$ as a positive electrode active material, 4% by weight of carbon black as a conductive agent, and 4% by weight of polyvinylidene fluoride (PVdF) as a binder were added to N-methyl-2-pyrrolidone (NMP) as a solvent to prepare positive electrode mixture slurry. The positive electrode mixture slurry was applied to an aluminum (Al) thin film having a thickness of about 20 μm as a positive electrode current collector. Then, the thin film was dried and then subjected to roll press to manufacture a positive electrode.

96% by weight of carbon powder as a negative electrode active material, 3% by weight of PVdF as a binder, and 1% by weight of carbon black as a conductive agent were added to NMP as a solvent to prepare negative electrode mixture slurry. The negative electrode mixture slurry was applied to a copper (Cu) thin film having a thickness of 10 μm as a negative electrode current collector. Then, the thin film was dried, and then subjected to roll press to manufacture a negative electrode.

A pouch-type battery was manufactured according to a conventional method using the manufactured positive and negative electrodes and a separator composed of three layers of polypropylene/polyethylene/polypropylene (PP/PE/PP). Then, the electrolytes prepared in Examples 1 to 8 and Comparative Examples 1 and 2 were injected into the pouch-type battery to manufacture lithium secondary batteries.

TEST EXAMPLES

The performance of the manufactured secondary batteries was evaluated according to the following methods, and the results are shown in Table 1 below.

[Evaluation of HPPC Charge Resistance]

HPPC charge resistance was measured according to the method prescribed in the literature "Battery test manual for plug-in hybrid electric vehicles (2010, Idaho National Laboratory for the U.S. Department of Energy)".

At a high temperature of 45° C., a measurement voltage value, a charge/discharge current value corresponding to C-rate, current change (ΔI), discharge voltage change (ΔV), charge voltage change (ΔV), discharge resistance, and charge resistance were measured. A resistance value was calculated using a slope value obtained from change in current and voltage by briefly flowing charge/discharge current for each C-rate for a certain period of time.

[Evaluation of High-Temperature Recovery Capacity]

According to the charging conditions, charging was performed at a constant current of 1.0 C and a voltage of 4.2 V until charging current became 1/10 C. According to the discharging conditions, after performing charging and discharging by discharging to 3.0 V at a constant current of 1.0 C, discharge capacity was measured.

After charging was performed under the same charging and discharging conditions, the battery was stored in a thermostat at 45° C. for 4 weeks, and then discharged to a discharge voltage of 3 V at a room temperature of 25° C. Then, the remaining capacity was measured. Thereafter, recovery capacity was measured after 100 cycles under the same charging and discharging conditions, and the average value thereof was calculated.

[Evaluation of High-Temperature Lifespan]

The secondary battery was charged with constant current at 45° C. at a current of 1 C rate until voltage reached 4.20 V (vs. Li), and then cut off at a current of 0.05 C rate while maintaining 4.20 V in a constant voltage mode. Subsequently, discharge was performed at a constant current of 1 C rate until voltage reached 3.0 V (vs. Li) during discharge (1st cycle). The above cycle was repeated 300 times, and the average value thereof was calculated.

TABLE 1

| Classification | Additive (% by weight) | | HPPC charge resistance (mΩ) | High-temperature recovery capacity (mAh) | High-temperature lifespan efficiency (%) |
|---|---|---|---|---|---|
| Example 1 | Chemical Formula 29 (0.5) | — | 47.1 | 819.3 | 88.3 |
| Example 2 | Chemical Formula 29 (0.5) | LiDFOP (1.0) | 48.1 | 817.1 | 88.5 |
| Example 3 | Chemical Formula 29 (0.3) | LiDFOP (1.0) | 47.8 | 821.3 | 88.1 |
| Example 4 | Chemical Formula 29 (0.8) | LiDFOP (1.0) | 47.3 | 816.4 | 88.8 |
| Example 5 | Chemical Formula 29 (1.0) | LiDFOP (1.0) | 48.8 | 816.5 | 87.9 |
| Example 6 | Chemical Formula 29 (2.0) | LiDFOP (1.0) | 48.1 | 818.8 | 88.1 |
| Example 7 | Chemical Formula 53 (1.0) | — | 41.9 | 830.5 | 89.0 |
| Example 8 | Chemical Formula 53 (1.0) | LiDFOP (1.0) | 42.0 | 830.8 | 89.1 |
| Comparative Example 1 | — | LiDFOP (1.0) | 113.7 | 712.5 | 71.2 |
| Comparative Example 2 | Cyclic ethylene phosphate (0.5) | — | 98.3 | 710.1 | 75.4 |

As shown in Table 1, the secondary battery using the electrolyte additive of the present invention exhibited a charge resistance value of 41.9 to 48.8 mΩ. On the other hand, Comparative Example 1 using only LiDFOP, which is a conventional electrolyte additive, exhibited a high value of 113.7 mΩ, and Comparative Example 2 using only cyclic ethylene phosphate, which is an asymmetric phosphate, exhibited a high value of 98.3 mΩ. Based on these results, it was confirmed that the charge resistance value was reduced by up to 45% by using the electrolyte additive of the present invention. In addition, these results indicate that the output of a battery may be improved by the electrolyte additive of the present invention.

In addition, as a result of high-temperature recovery capacity evaluation, the secondary battery using the electrolyte additive of the present invention exhibited a high-temperature recovery capacity of 816.4 to 830.8 mAh. On the other hand, Comparative Examples 1 and 2 exhibited a high-temperature recovery capacity of 712.5 and 710.1 mAh. From these results, it can be seen that the comparative examples have a significantly lower high-temperature recovery capacity than the examples of the present invention. These results indicate that use of the electrolyte additive of the present invention improved recovery capacity at a high temperature of 45° C. In addition, it was confirmed that the electrolyte additive of the present invention has an effect of improving the recovery capacity efficiency of a battery when stored for a long time in a high-temperature environment.

In addition, as a result of high-temperature lifespan efficiency evaluation, the secondary battery using the electrolyte additive of the present invention exhibited a lifespan efficiency of 87.9 to 89.1% On the other hand, Comparative Examples 1 and 2 exhibited a lifespan efficiency of 71.2% and 75.4%, respectively. From these results, it can be seen that the lifespan efficiency of the comparative examples is lower than that of the examples of the present invention by up to 17.6% or more. These results indicate that use of the electrolyte additive of the present invention improved the capacity retention rate of a battery while repeating 300 cycles at a high temperature of 45° C. compared to the case of using only the conventional electrolyte additive. In addition, it can be seen that the cycle characteristics and lifespan efficiency of a battery are improved in a high-temperature environment by using the electrolyte additive of the present invention.

Therefore, when the electrolyte additive according to embodiments of the present invention and the electrolyte including the same are applied to a secondary battery, the charge resistance, output, recovery capacity, and lifespan efficiency of the secondary battery may be improved. Due to these characteristics, the secondary battery according to the present invention is suitable for use as a secondary battery for automobiles.

The invention claimed is:

1. An electrolyte additive, comprising a compound represented by one or more selected from the group consisting of compounds represented by Chemical Formulas 3 to 4, 6, 7, 9 to 16, 21 to 28, 37 to 41, 43, and 45 to 53 below:

[Chemical Formula 3]

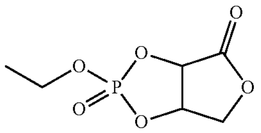

[Chemical Formula 4]

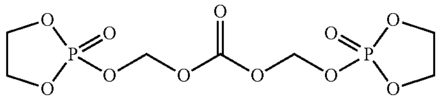

[Chemical Formula 6]

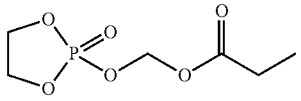

[Chemical Formula 7]

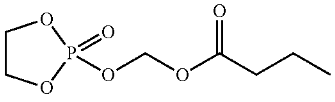

[Chemical Formula 9]

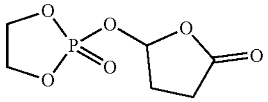

[Chemical Formula 10]

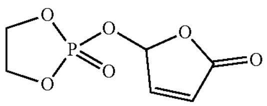

[Chemical Formula 11]

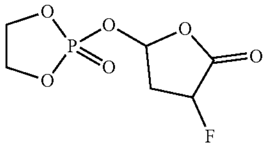

-continued

[Chemical Formula 12]

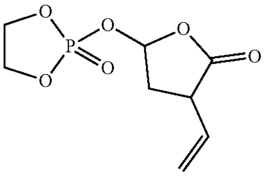

[Chemical Formula 13]

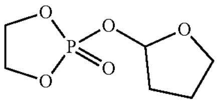

[Chemical Formula 14]

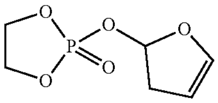

[Chemical Formula 15]

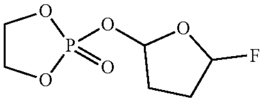

[Chemical Formula 16]

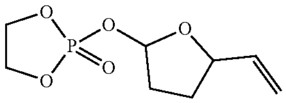

[Chemical Formula 21]

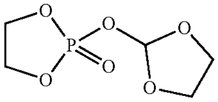

[Chemical Formula 22]

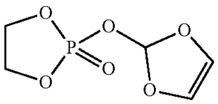

[Chemical Formula 23]

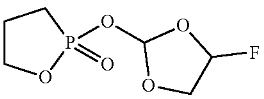

[Chemical Formula 24]

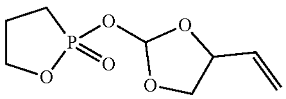

[Chemical Formula 25]

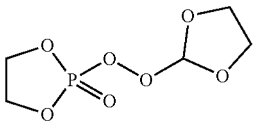

[Chemical Formula 26]

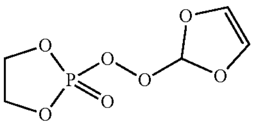

[Chemical Formula 27]

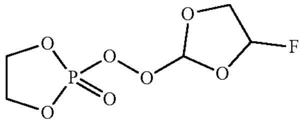

-continued

[Chemical Formula 28]

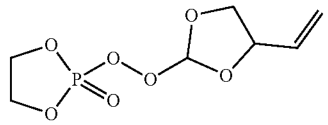

[Chemical Formula 37]

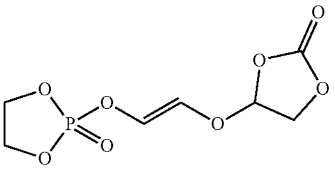

[Chemical Formula 38]

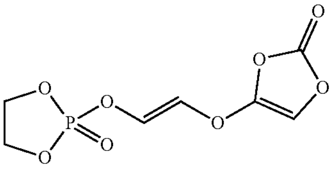

[Chemical Formula 39]

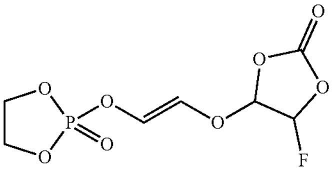

[Chemical Formula 40]

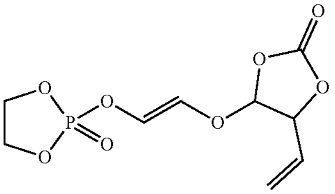

[Chemical Formula 41]

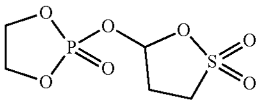

[Chemical Formula 43

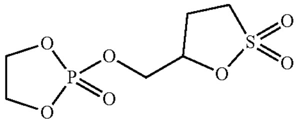

[Chemical Formula 45]

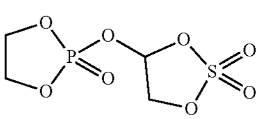

[Chemical Formula 46]

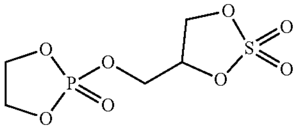

[Chemical Formula 47]

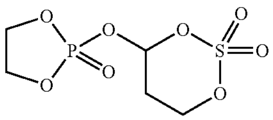

-continued

[Chemical Formula 48]

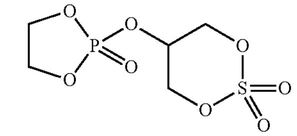

[Chemical Formula 49]

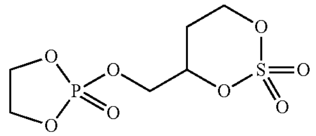

[Chemical Formula 50]

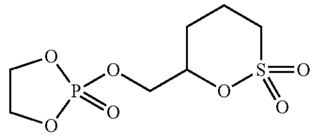

[Chemical Formula 51]

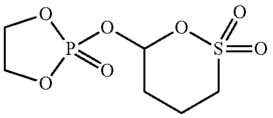

[Chemical Formula 52]

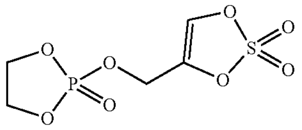

[Chemical Formula 53]

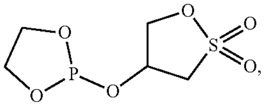

wherein, in Chemical Formulas 3 to 4, 6, 7, 9 to 16, 21 to 28, 37 to 41, 43, and 45 to 53, lines are bonds; when an element is not indicated separately, a point where one bond meets another bond is carbon; and hydrogens which number satisfies a valence of the carbon is omitted.

2. An electrolyte, comprising an organic solvent, a lithium salt, and an electrolyte additive, wherein the electrolyte additive comprises a compound represented by one or more selected from the group consisting of compounds represented by Chemical Formulas 3 to 4, 6, 7, 9 to 16, 21 to 28, 37 to 41, 43, and 45 to 53 below:

[Chemical Formula 3]

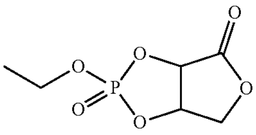

[Chemical Formula 4]

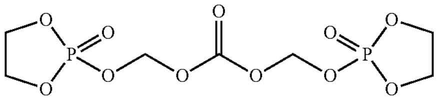

[Chemical Formula 6]

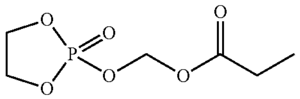

-continued

[Chemical Formula 7]

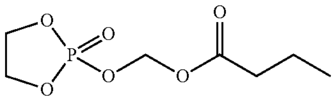

[Chemical Formula 9]

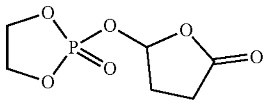

[Chemical Formula 10]

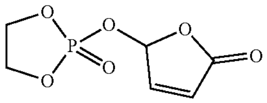

[Chemical Formula 11]

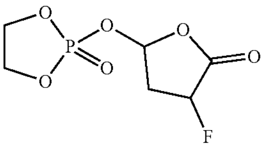

[Chemical Formula 12]

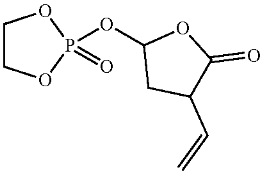

[Chemical Formula 13]

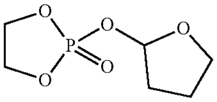

[Chemical Formula 14]

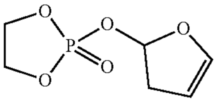

[Chemical Formula 15]

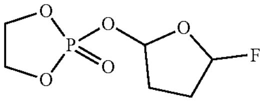

[Chemical Formula 16]

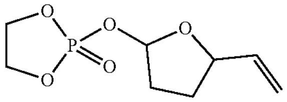

[Chemical Formula 21]

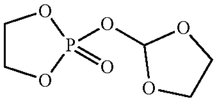

[Chemical Formula 22]

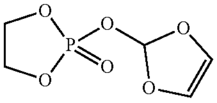

[Chemical Formula 23]

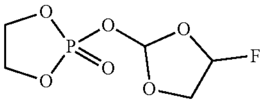

[Chemical Formula 24]

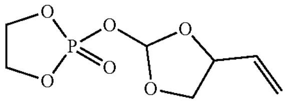

-continued

[Chemical Formula 25]

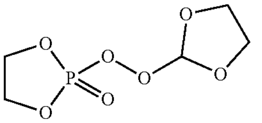

[Chemical Formula 26]

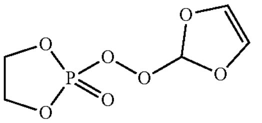

[Chemical Formula 27]

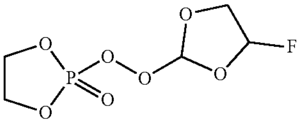

[Chemical Formula 28]

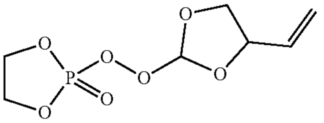

[Chemical Formula 37]

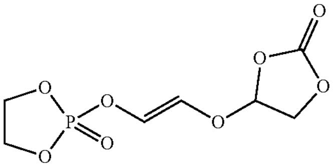

[Chemical Formula 38]

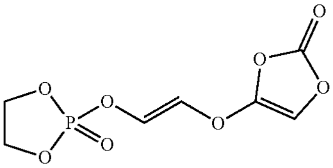

[Chemical Formula 39]

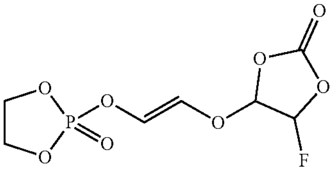

[Chemical Formula 40]

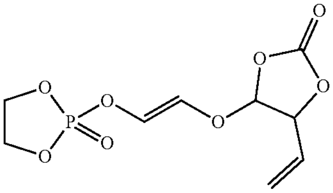

[Chemical Formula 41]

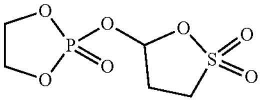

[Chemical Formula 43]

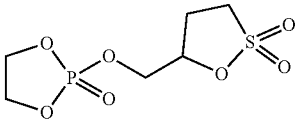

-continued

[Chemical Formula 45]

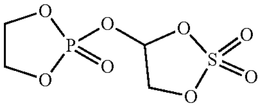

[Chemical Formula 46]

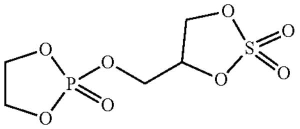

[Chemical Formula 47]

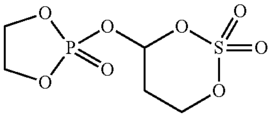

[Chemical Formula 48]

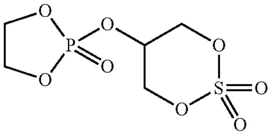

[Chemical Formula 49]

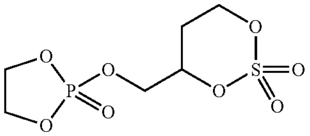

[Chemical Formula 50]

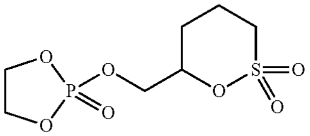

[Chemical Formula 51]

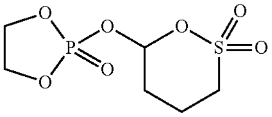

[Chemical Formula 52]

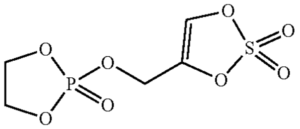

[Chemical Formula 53]

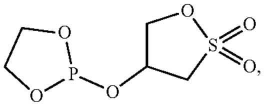

wherein, in Chemical Formulas 3 to 4, 6, 7, 9 to 16, 21 to 28, 37 to 41, 43, and 45 to 53, lines are bonds; when an element is not indicated separately, a point where one bond meets another bond is carbon; and hydrogens which number satisfies a valence of the carbon is omitted.

3. The electrolyte according to claim 2, wherein, based on 100% by weight in total of the electrolyte, the electrolyte additive is comprised in an amount of 0.1 to 10% by weight.

4. The electrolyte according to claim 2, wherein the organic solvent comprises one or more selected from the group consisting of ethylene carbonate (EC), diethyl carbonate (DEC), ethylmethyl carbonate (EMC), dimethyl carbonate (DMC), propylene carbonate (PC), dipropyl carbonate (DPC), butylene carbonate, methylpropyl carbonate, and ethylpropyl carbonate.

5. The electrolyte according to claim 2, wherein the lithium salt comprises one or more selected from the group consisting of $LiPF_6$, $LiF_4$, LiCl, LiBr, LiI, $LiClO_4$, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, and $(CF_3SO_2)_2NLi$.

6. The electrolyte according to claim 2, wherein the electrolyte comprises a metal phosphate compound.

7. The electrolyte according to claim 6, wherein the metal phosphate compound comprises one or more selected from the group consisting of lithium difluoro(bisoxalato) phosphate, lithium tetrafluoro oxalato phosphate, lithium difluorophosphate, and lithium trioxalato phosphate.

8. A secondary battery, comprising a negative electrode, a positive electrode, a separator interposed between the negative and positive electrodes, and an electrolyte, wherein the electrolyte is the electrolyte according to claim 4.

9. The secondary battery according to claim 8, wherein the secondary battery has an HPPC charge resistance value of 500 mΩ or less at 25° C.

10. The secondary battery according to claim 8, wherein the secondary battery has a recovery capacity of 580 mAh or more at 45° C.

11. The secondary battery according to claim 8, wherein the secondary battery has a lifespan maintenance efficiency of 80% or more at 45° C.

12. The secondary battery according to claim 8, wherein the secondary battery is a battery for automobiles.

* * * * *